United States Patent [19]

Gallant et al.

[11] Patent Number: 5,711,008
[45] Date of Patent: Jan. 20, 1998

[54] CELLULAR PACKET DATA ARRANGEMENT

[75] Inventors: Martin Louis Joseph Gallant, Garland; Emad Abdel-Lateef Qaddoura; Patricia Ann Landgren, both of Plano, all of Tex.

[73] Assignee: Northern Telecom Limited, Montreal, Canada

[21] Appl. No.: 396,607

[22] Filed: Mar. 1, 1995

[51] Int. Cl.$^6$ .............................. H04Q 7/20; H04Q 7/24
[52] U.S. Cl. ................... 455/466; 455/422; 455/432; 455/436; 370/328
[58] Field of Search .............................. 379/58, 59, 60, 379/62; 455/33.1, 33.2, 466, 422, 432, 436; 370/328, 402, 419, 345

[56] References Cited

U.S. PATENT DOCUMENTS

| | | | |
|---|---|---|---|
| 5,353,331 | 10/1994 | Emery et al. | 379/58 |
| 5,457,680 | 10/1995 | Kamm et al. | 379/59 X |
| 5,511,098 | 4/1996 | Gardner | 375/340 |

FOREIGN PATENT DOCUMENTS

| | | |
|---|---|---|
| 0 566 407 | 10/1993 | European Pat. Off. . |
| 92/19059 | 10/1992 | WIPO . |

OTHER PUBLICATIONS

Chang et al., "Architecture Alternative for Wireless Data Services: Interworking With Voiceband and Modem", Networks for Personal Comm. Conf. Proc., pp. 1–8, (1994).

S. Barber et al., "Dual-Mode System Provides Smooth Evolution Path", *Telesis*, No. 94:35–51, (1992).

*Primary Examiner*—Dwayne Bost
*Assistant Examiner*—Nay Maung
*Attorney, Agent, or Firm*—Foley & Lardner

[57] ABSTRACT

A cellular packet data arrangement includes an interface unit (NIU) to a packet data network and link interface units (LIUs) each providing a channel to a respective radio transceivers for communicating data packets with mobile terminals each having an individual identifier (TEI). Each LIU stores the TEI, channel number, and protocol data for communications with each mobile terminal handled by the LIU. In response to a first LIU receiving a communication from a mobile terminal whose communications have previously been on a channel handled by a second LIU, this is identified from the mobile terminal's TEI not being stored in the first LIU and being stored in the NIU in respect of the second LIU, and the protocol data for the mobile terminal is transferred from the second to the first LIU. To avoid a possible error condition, the first LIU can suppress a reply to the communication from the mobile terminal until this is resent.

7 Claims, 3 Drawing Sheets

CELLULAR PACKET DATA ARRANGEMENT

This invention relates to a cellular packet data arrangement in which radio transceivers provide communications in geographical cells with mobile data terminals each having a respective identifier.

BACKGROUND OF THE INVENTION

Cellular telephone systems, in which mobile telephone terminals communicate with the public switched telephone network and among themselves via radio transceivers arranged in geographical cells, have become well known. The advantages of mobility of the telephone terminals are resulting in such systems being increasingly deployed and used for voice communications.

There is similarly a substantial and increasing need for cellular data services, in which mobile data terminals communicate data traffic with existing data networks, and among themselves, also via radio transceivers arranged in geographical cells. In order to address this need, a cellular digital packet data (CDPD) specification has been proposed in which a CDPD system is provided as an overlay on an existing cellular telephone system. In this proposal, the radio transceivers of the cellular system serve not only for providing voice communications with mobile telephone terminals but also for providing packet data communications with mobile data terminals, using the spare capacity of the cellular system within the same cellular arrangement and the same allocated frequency spectrum.

A cellular system comprises cell-site equipment in each cell and an intermediate system which is common to all the cells in a geographic or serving area and provides connections to the public switched telephone network (PSTN) and, when enhanced with the CDPD system, to existing packet data networks. The cell-site equipment comprises a plurality of, for example up to 128, fixed radio transmit-receive units or transceivers (TR) each operating on a respective transmit frequency channel and a respective receive frequency channel for radio communications with mobile terminals within the cell, and an integrated cell-site remote multiplexer (ICRM) which provides a multiplexed wired connection to the intermediate system. The mobile data intermediate system (MD-IS) comprises a data interface unit to existing packet data networks, a cellular peripheral unit to which the ICRM of each cell-site is connected, and a switch and control unit providing inter-connections between these units and to the PSTN. For example, the geographic area served by the MD-IS may comprise up to 512 cells and hence ICRMs.

The MD-IS conceals the mobility of the terminals from the fixed PSTN and data networks, and consequently is responsible for terminating two data communications protocols, MDLP and SNDCP, which are used for communications with the mobile data terminals. The MDLP (Mobile Data Link Protocol) provides datalink layer functionality similar to the CCITT LAPD (Link Access Protocol for the D Channel) Q.921 protocol, with minor enhancements related to being carried over a radio interface. The SNDCP (SubNetwork Dependent Convergence Protocol) terminates Internet Protocol (IP) datagrams from the fixed data network and transforms them into a form suitable for transmission using the MDLP. More specifically, the SNDCP serves for compression of the IP header, segmentation of IP datagrams into shorter MDLP frames, and encryption of the resulting frames for secure radio transmission.

As a part of the process of initially registering into the geographical area served by the MD-IS, each mobile data terminal (MT) is assigned a temporary equipment identifier (TEI) which is unique to that terminal throughout the serving area of the MD-IS. Mobility of the MTs is managed by the MD-IS by maintaining an association between each TEI and its serving radio channel. The MD-IS maintains a protocol stack which contains data relating to the MDLP and SNDCP for the data communications with each MT.

Unlike in conventional cellular telephone systems, transfer of a mobile data terminal between different radio channels is carried out autonomously by the MT, without explicit assistance from the MD-IS. Whenever an MT determines an undesired condition such as a low signal strength or a high bit error rate, it scans adjacent frequencies to find a better signal on another frequency channel. It then autonomously tunes to the new channel, and notifies the MD-IS of its transfer by sending an MDLP polling command with its assigned TEI. The MD-IS recognizes that a channel transfer has occurred as a result of the MDLP packet for this TEI being received on a new channel, different from the channel previously used for this TEI. Such a channel transfer occurs when the MT moves between different cells (for which reason it may also be referred to as a cell transfer), and may also occur between different channels while the MT moves within a single cell.

The CDPD specification treats the MD-IS as a single device which concurrently manages all of the radio channels in its serving area. Implementation of the processing for channel transfers is relatively easy if there is only one processing unit which manages all channels: it is simply necessary to record the TEI as being associated with the new channel, all of the protocol stack data being preserved without any change.

Whenever an MT enters a new serving area served by a different MD-IS, it must completely re-register into that area and obtain a new TEI. Because the re-registration process can be disruptive to upper layer applications, for example resulting in delays which are noticeable to the user of the MT, it is desirable to reduce the occurrence of re-registrations by making the serving area of each MD-IS as large as possible. A practical consequence of this is that the MD-IS must support several hundred radio channels.

As a result, the termination in the MD-IS of all of the MDLP datalinks carried over all of the radio channels can not be implemented using a single processing unit, and instead a distributed processing architecture, using multiple processing units, is required. This presents a problem in that, when an MT performs a channel transfer between channels handled by different processing units, the processing unit handling the new channel to which the MT has transferred does not have available to it the protocol stack data for the MT.

An object of this invention is to provide a cellular packet data arrangement in which this problem is solved.

SUMMARY OF THE INVENTION

According to one aspect of this invention there is provided a cellular packet data arrangement comprising: a plurality of radio transceivers for providing communications in geographical cells with mobile terminals each having a respective identifier (TEI); an interface unit (NIU) for providing an interface to a packet data network; and at least two link interface units (LIUs) each for providing a plurality of channels each for communicating data packets between the NIU and a respective one of the radio transceivers, each LIU storing the TEI of each mobile terminal having communications being handled by the LIU, an indication of the channel for such communications, and protocol data for the communications; wherein the NIU and the LIUs are arranged so that, in response to communications being received on a channel of a first LIU from a mobile terminal whose TEI is not stored in the first LIU and whose protocol data is stored in another, second, LIU: the protocol data for the mobile terminal is transferred from the second LIU to the first LIU; the TEI of the mobile terminal is stored in the first LIU with an indication of the channel of the first LIU on which the communications from the mobile terminal are received; and the stored TEI of the mobile terminal is deleted from the second LIU.

In order to avoid a potential error indication arising as a result of the inherent delay in transferring the protocol data, preferably the first LIU is arranged to suppress a reply to an initial communication received from the mobile terminal whose TEI is not stored in the first LIU, and to reply to the mobile terminal in response to the initial communication being resent by the mobile terminal.

Preferably the NIU is arranged to store the TEI of each mobile terminal having communications being handled by each LIU with an indication of the LIU by which the communications with each mobile terminal are being handled, the first LIU being responsive to a TEI which is not stored therein to supply the TEI to the NIU, and the NIU being responsive to the supplied TEI to determine the indication of any LIU associated with the supplied TEI.

According to another aspect of this invention there is provided a method of handling packet data communications with a plurality of mobile data terminals in a cellular packet data arrangement comprising a packet data interface unit having a distributed processing architecture including a network interface unit (NIU) for interfacing with a packet data network, a plurality of link interface units (LIUs) each for interfacing with a plurality of channels for communicating data packets with mobile data terminals via respective radio transceivers, and a bus system interconnecting the NIU and the LIUs, comprising the steps of: storing in the NIU an individual identifier (TEI) for each mobile data terminal having communications handled by an LIU with an indication of the LIU handling communications for that TEI; in each LIU, storing the TEI of each mobile data terminal having communications handled by that LIU with an indication of the channel for those communications, and storing protocol data relating to the communications for that TEI; in response to an LIU receiving communications on a new channel from a mobile data terminal having a TEI stored in the LIU with an indication of a different channel, changing the indication of the channel for the communications for that TEI to the new channel; and in response to a first LIU receiving communications from a mobile data terminal having a TEI which is not stored in the first LIU, determining whether the TEI is stored in the NIU with an indication of another, second, LIU and, if so: storing the TEI in the first LIU with an indication of the channel of the first LIU on which the communications from the mobile terminal are received; transferring the protocol data for the TEI from the second LIU to the first LIU, the transferred protocol data being stored in the first LIU in association with the TEI; and deleting the stored TEI of the mobile terminal from the second LIU.

The invention also extends to an interface unit for a cellular packet data arrangement, the interface unit having a distributed processing architecture including a network interface unit (NIU) for interfacing with a packet data network, a plurality of link interface units (LIUs) each for interfacing with a plurality of channels for communicating data packets with mobile data terminals via respective radio transceivers, and a bus system interconnecting the NIU and the LIUs, wherein: each LIU includes a first table for storing an individual identifier (TEI) for each of a plurality of mobile data terminals having packet data communications handled by the LIU, and an indication of the channel on which such communications are communicated, and a second table for storing protocol data for the data packet communications for the TEI; the NIU includes a table for storing the TEI of each mobile data terminal having communications handled by any of the LIUs, with an indication of the LIU handling the communications for that TEI; and the NIU is responsive to a first LIU receiving communications from a mobile data terminal having a TEI which is not stored in the first LIU to determine from its table whether a second LIU has stored protocol data for that TEI, and if so to transfer the stored protocol data from the second LIU to the first LIU.

BRIEF DESCRIPTION OF THE DRAWING

The invention will be further understood from the following description with reference to the accompanying drawings, in which.

DETAILED DESCRIPTION

Figure 1:
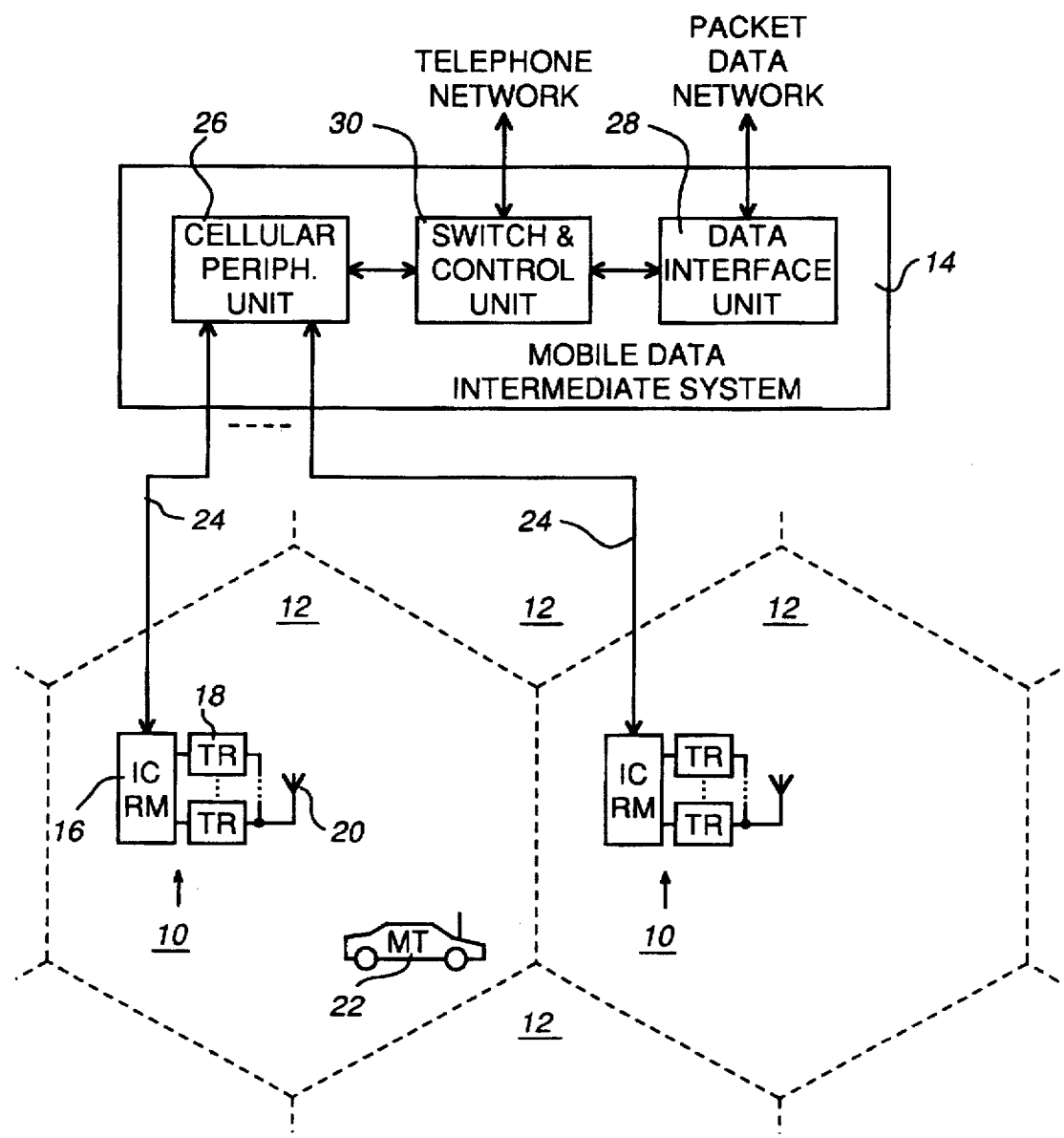
FIG. 1 schematically illustrates a known cellular radio communications system for providing voice and packet data communications.

Referring to FIG. 1, a known cellular radio communications system comprises cell-site equipment 10 in each of a plurality of geographic cells 12 within a geographic area served by an intermediate system which provides connections to the public switched telephone network (PSTN) and a mobile data intermediate system which provides packet data communications with one or more existing packet data networks. For convenience and simplicity in the following description these systems are collectively referred to as a mobile data intermediate system or MD-IS 14. The cells 12 are represented schematically in FIG. 1 by adjacent non-overlapping hexagonal areas of equal sizes, but the cells are more generally of differing shapes and sizes with indefinite and overlapping borders as determined by local signal conditions.

The cell-site equipment 10 in each cell 12 comprises an integrated cell-site remote multiplexer (ICRM) 16 and a plurality of radio transmit-receive units or transceivers (TRs) 18 having an antenna arrangement 20 for radio communications with mobile terminals including mobile telephone terminals (not shown) and at least one mobile data terminal (MT) 22. Each ICRM has a wired connection 24 for multiplexed communications with an intelligent cellular peripheral unit (ICP) 26 in the MD-IS 14. The MD-IS 14 also includes a data interface unit 28 to an existing packet data network and a switch and control unit 30 which provides inter-connections between the units 26 and 28 and to the PSTN.

As the arrangement and operation of the cell-site equipment 10 and the units 26 and 30 of the MD-IS 14 are well known in the art of cellular telephone systems, these are not further described here. By way of example, it is observed that these units can desirably be of the form described in an article entitled "Dual-Mode Cellular System Provides Smooth Evolution Path" by S. Barber et al., Telesis, No. 94, July 1992, pages 35 to 51, the TRs 18 being operated in either analog or digital mode for communications with respectively analog or digital mobile telephone terminals.

Each of one or more of the TRs 18 in each cell 12, operating on a respective transmit frequency channel and a respective receive frequency channel, is operated in its digital mode for providing packet data communications with MTs 22 within the cell. These packet data communications are communicated from the respective TR 18 via the associated ICRM 16 and path 24, the ICP 26, and the switch and control unit 30 to respective paths of the interface unit 28. Consequently, there is a logical communications path between each such TR 18 and the interface unit 28. For simplicity and convenience in understanding the invention, FIG. 2 shows only these logical channels, referenced 32, and not the physical equipment shown in FIG. 1 via which the logical channels are established.

Figure 2:
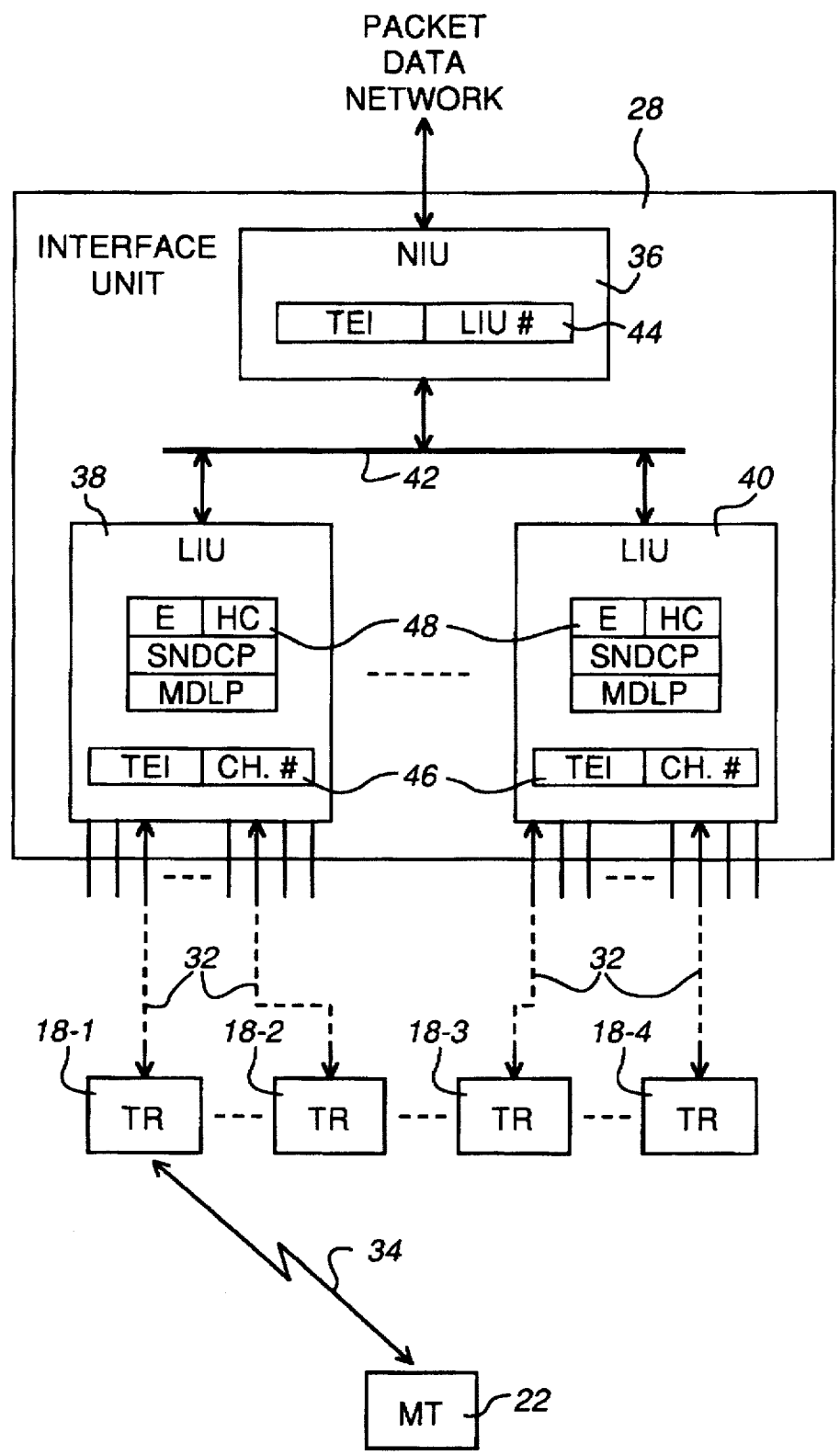
FIG. 2 schematically illustrates in a simplified manner a cellular packet dam arrangement in accordance with an embodiment of the invention.

FIG. 2 illustrates the interface unit 28, a plurality of TRs, which are individually referenced 18-1 to 18-4 and are generally referred to as TRs 18 as discussed above, for providing cellular packet data communications as discussed above and which are distributed among the cells 12 (not shown in FIG. 2), the logical channels 32 each between a respective TR 18 and the interface unit 28, and an MT 22 having a radio communications path 34 to one of the TRs 18-1.

The interface unit 28 comprises a plurality of processing units in a distributed processing architecture, represented by a network interface unit (NIU) 36 and a plurality of line interface units (LIUs) two of which are shown and referenced 38 and 40, all interconnected via a common bus system 42. The NIU 36 provides the interface to the existing packet data network, and maintains a table 44 as described below. Each of the LIUs 38, 40 provides the interface to a plurality of the logical channels 32, for communications with one or more MTs 22, and maintains tables 46 and 48 as described below. For example, each LIU can have the physical ability to terminate up to 32 of the logical channels 32. It should be appreciated that each logical channel can carry packet data communications for multiple MTs 22.

As explained in the background of the invention, on entering into the area served by the MD-IS 14, each MT is allocated an individual TEI (temporary equipment identifier) as a past of the registration process, this allocation being managed by the NIU 36 which accordingly maintains a record in the table 44 of all of the TEIs currently allocated to MTs in the serving area of this MD-IS. The TEI is used in the communications path 34 between each MT and the respective TR 18, and on the logical channels 32 between the respective TR 18 and the respective LIU 38 or 40.

A newly registering MT 22 then autonomously selects an optimum frequency channel for its use, and communicates on this channel with the respective TR, for example the TR 18-1 as shown by the path 34 in FIG. 2. In the table 46 in the LIU which is associated with this TR, for example the LIU 38 which as shown in FIG. 2 is connected via a logical channel 32 to the TR 18-1, the LIU stores the TEI of the MT 22 in association with a channel number (CH. #) identifying this logical channel and hence the TR 18-1. Via the bus system 42, the LIU 38 advises the NIU 36 of its communications with the new TEI, and the NIU 36 stores in the table 44 an association between this TEI and the identity (LIU #) of the LIU 38.

Data communications with the MT 22 via the TR 18-1 and the LIU 38 then take place in known manner, in accordance with data communications protocols (e.g. MDLP and SNDCP) as discussed in the background of the invention. Accordingly, the LIU 38 maintains in its table 48 a protocol stack for the MT 22, i.e. in respect of its TEI as stored in the table 46. This protocol stack includes data structures, as indicated in FIG. 2, relating to the current encryption state E, header compression state HC, and protocol states for the two protocols SNDCP and MDLP for the data communications with the MT 22 as identified by its TEI.

In the event that the MT 22 autonomously changes, as a result of its movement and consequent signal conditions, to the frequency of the adjacent TR 18-2, it transmits a Receive Ready polling command RR(P) including its TEI, and this is communicated via the receiver 18-2 and its logical channel 32 to the LIU to which this TR is coupled, which as shown in FIG. 2 is the same LIU 38. The LIU 38 recognizes from the received TEI in comparison to the TEIs stored in its table 46 that the MT 22 previously communicating via the channel for the TR 18-1 has changed to the channel for the TR 18-2, and accordingly changes the channel number (CH. #) associated with the TEI in its table 46. The LIU 38 then continues the communications with the MT 22 normally, continuing to use the protocol stack data already in its table 48 for this TEI.

With continuing movement, the MT 22 may autonomously change to the frequency of another adjacent TR 18-3. It transmits a Receive Ready polling command RR(P) including its TEI, and this is communicated via the receiver 18-3 and its logical channel 32 to the LIU to which this TR is coupled, which in this case as shown in FIG. 2 is a new LIU 40. The LIU 40 does not have this TEI of the MT 22 stored in its table 46, and accordingly communicates this TEI via the bus system 42 to the NIU 36. The NIU 36 determines that this is not a newly registering MT because its TEI is stored in the table 44, and that communications with this MT have previously been handled by the LIU 38 whose identity (LIU #) is stored in the table 44 in association with this TEI.

Consequently, the NIU 36, via the bus system 42, instructs the LIU 38 to transfer via the bus system 42 to the LIU 40 the protocol stack data for this TEI from its table 48, this data including all data frames which have been delivered to the MDLP in the LIU 38 but have not yet been acknowledged by the MT 22, and to delete the stored TEI from the table 46 of the LIU 38. The relevant part of the table 48 in the LIU 38 is cleared accordingly, and the protocol stack data for the MT 22 is newly stored for this TEI in the table 48 of the LIU 40. The LIU 40 stores the TEI in its table 46 in association with the channel number (CH. #) for the TR 18-3. Subsequently, and preferably in response to a repeated polling command as described below, the LIU 40 sends an acknowledgement to the MT 22 via this channel and the TR 18-3. The NIU 36 stores the number (LIU #) of the LIU 40, in place of the number of the LIU 38, in association with the TEI in the table 44 to update this table.

Similar processes take place with continued movement of the MT 22 anywhere within the serving area of the MD-IS, without any re-registration of the MT 22 even though its communications may be handled by different LIUs. A separate roaming protocol serves to handle the case of the MT 22 moving into a serving area of, and registering with, a different MD-IS.

In cases where, as described above, the MT 22 changes between frequencies of TRs 18 managed by different LIUs 38 and 40, there is a potential problem due to the time delay which may occur while the protocol stack data is transferred from the original to the new LIU before an acknowledgement is sent to the MT. This potential problem, and its solution, are explained below.

Figure 3:
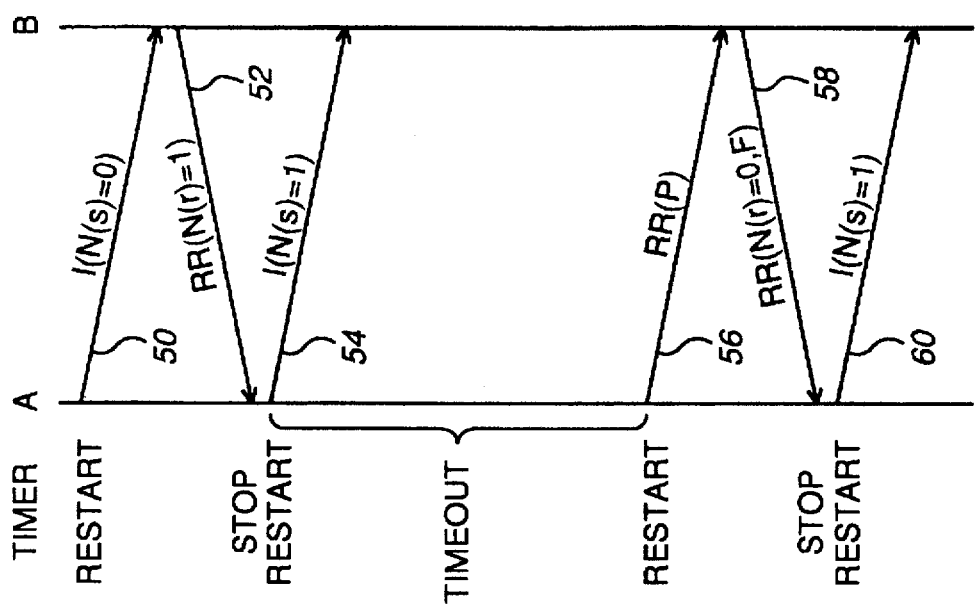
FIG. 3 is a diagram illustrating conventional packet data communications.

Referring to FIG. 3, a packet data signal flow between data stations A and B is illustrated in a conventional manner, with time progressing downwardly in the illustration. An arrow 50 represents an information packet I having a send sequence number N(s)=0 being sent from the station A to the station B, and an arrow 52 represents an acknowledging Receive Ready packet RR, indicating that the next packet to be received has a receive sequence number N(r)=1, being sent from the station B to the station A. In the station A, a timer is restarted from zero when the information packet is sent, and is stopped when the acknowledgement is received. The timer is restarted from zero when the next information packet I, with the send sequence number N(s)=1, is sent, this packet being represented by an arrow 54.

The illustration in FIG. 3 assumes that this information packet is not correctly received by the station B, for example it is discarded due to an incorrect cyclic redundancy check. The station B accordingly does not acknowledge this information packet, and the timer in the station A times out. The station A then sends a Receive Ready polling command RR(P), as represented by an arrow 56, and restarts the timer. The station B responds to this with a Receive Ready reply, shown by an arrow 58, with the poll/final bit set (F) and indicating that the last packet correctly received had the receive sequence number N(r)=0. On receipt of this, the station A stops the timer, and then resends the information packet I with the send sequence number N(s)=1 as shown by an arrow 60, restarting the timer accordingly.

Figure 4:
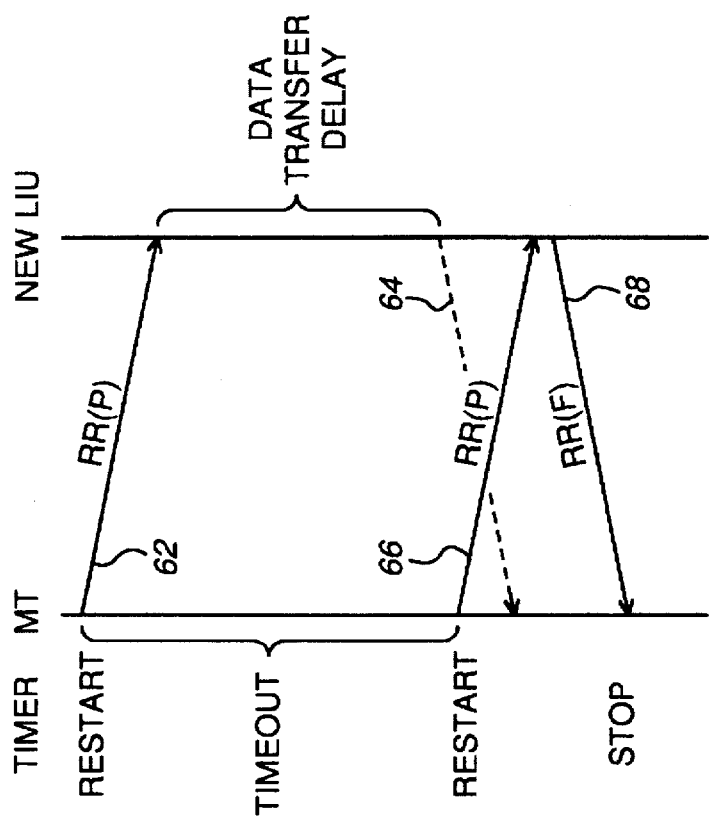
FIG. 4 is a diagram illustrating packet data communications in accordance with an aspect of this invention.

FIG. 4 shows a similar diagram for communications between the MT and the new LIU (NEW LIU) in the case described above in which the MT autonomously changes to a frequency of a TR 18 whose communications are handled by an LIU different from that previously handling the communications with the MT, and to which the protocol stack data is transferred as described above. Initially, as described above the MT sends a Receive Ready polling command RR(P) as shown by an arrow 62, and starts its timer. At the new LIU, there is a delay while the protocol stack data is transferred, before a reply can be sent as represented by a dashed line 64. Depending on this delay and other timing considerations, such an acknowledgement would not reach the MT until after its timer has timed out, as indicated in FIG. 4. On the timer timing out, the MT resends the Receive Ready polling command RR(P) as shown by an arrow 66, and the LIU responds to this with the reply packet RR(F) as shown by an arrow 68.

With this sequence of events, the problem arises that the MT would receive the reply represented by the arrow 64 after it has resent the polling command as represented by the arrow 66. It would subsequently receive the reply represented by the arrow 68 and would interpret this as being unsolicited, consequently producing an error indication.

In order to avoid this problem, the new LIU deliberately suppresses the initial reply represented by the dashed line 64, so that this is not sent, and waits for the MT to resend its polling command (arrow 66) before it sends any reply. This ensures that the MT receives only one reply (arrow 68) after it has resent the polling command.

It can be appreciated that the new LIU can either always suppress the initial reply 64 when a data transfer is necessary, or it can selectively suppress this on a timed basis whenever it determines that the data transfer delay is sufficient that the timer in the MT may time out.

Although a particular embodiment of the invention has been described in detail above, it should be appreciated that numerous modifications, variations, and adaptations may be made without departing from the scope of the invention as defined in the claims.

What is claimed is:

1. A cellular packet data arrangement comprising:
   a plurality of radio transceivers for providing communications in geographical cells with mobile terminals each having a respective identifier (TEI);
   an interface unit (NIU) for providing an interface to a packet data network; and
   at least two link interface units (LIUs) each for providing a plurality of channels each for communicating data packets between the NIU and a respective one of the radio transceivers, each LIU storing the TEI of each mobile terminal having communications being handled by the LIU, an indication of the channel for such communications, and protocol data for the communications;
   wherein the NIU and the LIUs are arranged so that, in response to communications being received on a channel of a first LIU from a mobile terminal whose TEI is not stored in the first LIU and whose protocol data is stored in another, second, LIU:
   the protocol data for the mobile terminal is transferred from the second LIU to the first LIU;
   the TEI of the mobile terminal is stored in the first LIU with an indication of the channel of the fast LIU on which the communications from the mobile terminal are received; and
   the stored TEI of the mobile terminal is deleted from the second LIU.

2. An arrangement as claimed in claim 1 wherein the fast LIU is arranged to suppress a reply to an initial communication received from the mobile terminal whose TEI is not stored in the first LIU, and to reply to the mobile terminal in response to the initial communication being resent by the mobile terminal.

3. An arrangement as claimed in claim 1 wherein the NIU is arranged to store the TEI of each mobile terminal having communications being handled by each LIU with an indication of the LIU by which the communications with each mobile terminal are being handled, wherein the first LIU is responsive to a TEI which is not stored therein to supply the TEI to the NIU, and the NIU is responsive to the supplied TEI to determine the indication of any LIU associated with the supplied TEI.

4. An arrangement as claimed in claim 3 wherein the first LIU is arranged to suppress a reply to an initial communication received from the mobile terminal whose TEI is not stored in the first LIU, and to reply to the mobile terminal in response to the initial communication being resent by the mobile terminal.

5. A method of handling packet data communications with a plurality of mobile data terminals in a cellular packet data arrangement comprising a packet data interface unit having a distributed processing architecture including a network interface unit (NIU) for interfacing with a packet data network, a plurality of link interface units (LIUs) each for interfacing with a plurality of channels for communicating data packets with mobile data terminals via respective radio transceivers, and a bus system interconnecting the NIU and the LIUs, comprising the steps of:

storing in the NIU an individual identifier (TEI) for each mobile data terminal having communications handled by an LIU with an indication of the LIU handling communications for that TEI;

in each LIU, storing the TEI of each mobile data terminal having communications handled by that LIU with an indication of the channel for those communications, and storing protocol data relating to the communications for that TEI;

in response to an LIU receiving communications on a new channel from a mobile data terminal having a TEI stored in the LIU with an indication of a different channel, changing the indication of the channel for the communications for that TEI to the new channel; and in response to a first LIU receiving communications from a mobile data terminal having a TEI which is not stored in the first LIU, determining whether the TEI is stored in the NIU with an indication of another, second, LIU and, if so:

storing the TEI in the first LIU with an indication of the channel of the first LIU on which the communications from the mobile terminal are received;

transferring the protocol data for the TEI from the second LIU to the first LIU, the transferred protocol data being stored in the first LIU in association with the TEI; and deleting the stored TEI of the mobile terminal from the second LIU.

6. A method as claimed in claim 5 and further comprising the step of suppressing a reply to an initial communication received from the mobile terminal whose TEI is not stored in the first LIU, and replying from the first LIU to the mobile terminal in response to the initial communication being resent by the mobile terminal.

7. An interface unit for a cellular packet data arrangement, the interface unit having a distributed processing architecture including a network interface unit (NIU) for interfacing with a packet data network, a plurality of link interface units (LIUs) each for interfacing with a plurality of channels for communicating data packets with mobile data terminals via respective radio transceivers, and a bus system interconnecting the NIU and the LIUs, wherein:

each LIU includes a first table for storing an individual identifier (TEI) for each of a plurality of mobile data terminals having packet data communications handled by the LIU, and an indication of the channel on which such communications are communicated, and a second table for storing protocol data for the data packet communications for the TEI;

the NIU includes a table for storing the TEI of each mobile data terminal having communications handled by any of the LIUs, with an indication of the LIU handling the communications for that TEI; and the NIU is responsive to a first LIU receiving communications from a mobile data terminal having a TEI which is not stored in the first LIU to determine from its table whether a second LIU has stored protocol data for that TEI, and if so to transfer the stored protocol data from the second LIU to the first LIU.

* * * * *